United States Patent
Li

(10) Patent No.: US 7,251,614 B1
(45) Date of Patent: Jul. 31, 2007

(54) FORECASTING A LAST TIME BUY QUANTITY FOR A SERVICE PART USING A LOW-PASS FILTER APPROACH

(75) Inventor: Yikang Li, Bridgewater, NJ (US)

(73) Assignee: i2 Technologies US, Inc., Dallas, TX (US)

( * ) Notice: Subject to any disclaimer, the term of this patent is extended or adjusted under 35 U.S.C. 154(b) by 1198 days.

(21) Appl. No.: 10/139,102

(22) Filed: May 2, 2002

(51) Int. Cl.
 *G06Q 10/00* (2006.01)
(52) U.S. Cl. .................................................... 705/10
(58) Field of Classification Search .................. 705/10
 See application file for complete search history.

(56) References Cited

U.S. PATENT DOCUMENTS

| | | | | |
|---|---|---|---|---|
| 5,210,704 | A | * | 5/1993 | Husseiny ..................... 702/34 |
| 5,216,612 | A | * | 6/1993 | Cornett et al. ............... 700/96 |
| 5,630,070 | A | * | 5/1997 | Dietrich et al. .............. 705/8 |
| 6,738,748 | B2 | * | 5/2004 | Wetzer .......................... 705/9 |

FOREIGN PATENT DOCUMENTS

JP   2001249964 A  *  9/2001

OTHER PUBLICATIONS

Albright, Brian; "The just-in-case supply chain", Sep. 2001, Frontline Solutions, 2, 10, ABI/INFORM Global, p. 22(7pgs).*

Moore, John B Jr.; "Forecasting and Scheduling for Past-Model Replacement Parts", Dec. 1971, Management Science, 18, 4, ABI/INFORM Global, p. B200.*

Cox, William E., Jr; "Product Life Cycles as Marketing Models", (Oct. 1967), The Journal of Business, vol. 40, No. 4, pp. 375-384. retrieved from the internet at: http://links.jstor.org/sici?sici=0021-9398%28196710%2940%3A4%3C375%3APLCAMM%3E2.0.CO%3B2-A.*

(Continued)

*Primary Examiner*—Romain Jeanty
*Assistant Examiner*—Jonathan G Sterrett
(74) *Attorney, Agent, or Firm*—Booth Udall, PLC

(57) ABSTRACT

In one embodiment of the present invention, a method for forecasting a Last Time Buy quantity for a service part using a low-pass filter approach is provided. The method includes accessing input data including: (1) a service lifespan beginning at the end of mass production of a product associated with the service part; (2) data reflecting past accumulated production of the associated product for at least a first period beginning at the end of mass production of the associated product; and (3) an order data series reflecting past quantities of the service part ordered in each of a succession of periods beginning with a second period that immediately follows the first period and ending with a current period. A low-pass filter is applied to at least a portion of the order data series to extract low frequency components representing a smoothed order data series. A local maximum is sought within the smoothed order data series subject to predetermined conditions. If a local maximum is found within the smoothed order data series, exponential forecasting is performed according to the smoothed order data series to generate an estimated Last Time Buy quantity for the service part over all remaining periods of the service lifespan following the current period. The estimated Last Time Buy quantity for the service part is made available for use in connection with one or more business analyses.

33 Claims, 1 Drawing Sheet

OTHER PUBLICATIONS

Solomon, et.al., "Electronic Part Life Cycle Concepts and Obsolescence Forecasting", Dec. 2000, IEEE Transactions on Components and Packaging Technologies, vol. 23, No. 4, pp. 707-717.*

Sullivan, Laurie, "Obsolete-Parts Program Thriving", Jan. 2002, EBN, Manhasset, Iss 1296, p. 26, ProQuest ID 101195090.*

Webster, Lee R.; "Failure Rates & Life Cycle Costs", Apr. 1998, Consulting-Specifying Engineer; 23, 4; ABI/INFORM Global, p. 42.*

White, Gary E; Ostwald, Phillip F; "Life Cycle Costing", Jan. 1976, Management Accounting, 57, 7, ABI/INFORM Global, p. 39.*

Krupp, James A G; "Forecasting for the Automotive Aftermarket", Winter 1993-1994, The Journal of Business Forecasting Methods & Systems; 12, 4, ABI/INFORM Global,p. 8.*

Handfield, Robert B; Pannesi, Ronald T; "Managing component life cycles in dynamic technological environment", Spring 1994, International Journal of Purchasing and Materials Management, Tempe, vol. 30, Iss. 2, p. 20, 9 pgs, ProQuest ID 590096.*

Porter, G. Zell, "An Economic Method for Evaluating Electronic Component Obsolescence Solutions", May 1998, pp. 1-9. retrieved from the web at www.gidep.org/data dmsms/library/zell.pdf.*

Swanson, E Burton; Dans, Enrique; "System Life Expectancy and the Maintenance Effort: Exploring Their Equilibration", Jun. 2000, MIS Quarterly; 24, 2, ABI/INFORM Global, p. 277.*

PRNewswire, "Aspect Development introduces Industry-first Enterprise integrated Life Cycle Management Solution", Jan. 11, 1999, p. 1938, Dialog 06071317 53547702.*

Santarini, Michael, "Forecasts the probably obsolescence of components—Module predicts parts life.", Jan. 11, 1999, Electronic Engineering Times, p. 48(1),Dialog 06071603 53548246.*

Roos, Gina, "Web-based service helps OEMs cure parts obsolescence blues", Oct. 8, 2001, Electronic Engineering Times, p. 86, Dialog 09056737 78968668.*

Thietart, R. A; Vivas, R; "An Empirical Investigation of Success Strategies for Businesses Along the Product Life Cycle Curve", Dec. 1984, Management Science, 30, 12, ABI/INFORM Global, p. 1405.*

Gilbert, Alorie; "Aspect Deal Continues i2's Push Into E-Commerce—$9.3 billion acquisition positions supply-chain vendor as business-to-business commerce", Mar. 20, 2000, InformationWeek, retrieved from the web at http://www.informationweek.com/778/i2.htm.*

* cited by examiner

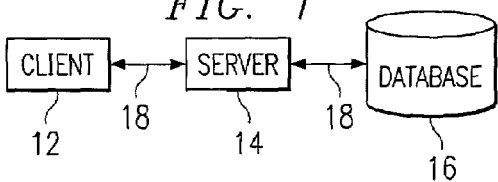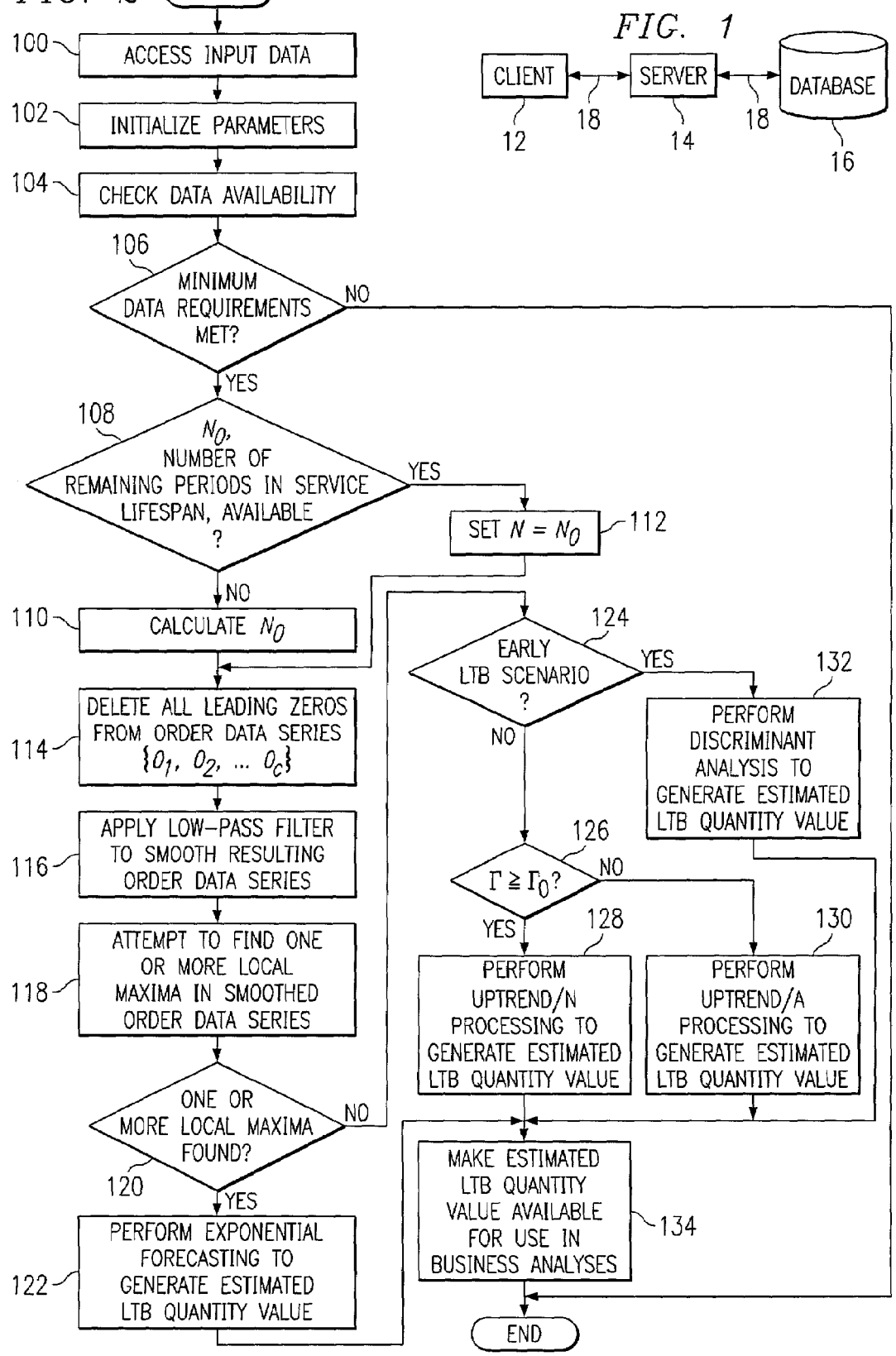

FORECASTING A LAST TIME BUY QUANTITY FOR A SERVICE PART USING A LOW-PASS FILTER APPROACH

TECHNICAL FIELD OF THE INVENTION

This invention relates generally to business forecasting and analysis and more particularly to forecasting a Last Time Buy quantity for a service part using a low-pass filter approach.

BACKGROUND OF THE INVENTION

Business forecasting and analysis concerning products are fundamental tasks for many manufacturers, suppliers, retailers, and other enterprises that must furnish products in response to demand from purchasers. From a consumption perspective, products in industries such as automotive, high tech, electronics, appliances, and the like have consumption life cycles (e.g., the time between purchase of the product and the end of its useful life). From a manufacturing perspective, such products have production life cycles (e.g., the entire time of mass production of the product). A product may remain in use for quite some time after the end of mass production. During this time (between the end of the production life cycle and the end of the consumption life cycle), original parts within the product may need to be replaced with service parts to keep the products operating properly. However, manufacturers are typically only responsible to provide such service parts for a specified service lifespan, for example, according to law, regulations, business goals, or any other guidelines depending on the product. As an example, mass production of the 1996 FORD TAURUS model might have ended in April 1997, but as the manufacturer of the model FORD might still be responsible to supply necessary service parts for this model for at least a specified number of years after April 1997.

The phrase "Last Time Buy" quantity for a service part is generally used to refer to the total quantity of demand (such as in the form of purchaser orders) for the service part between a selected point in time after mass production of the associated product ends to the end of the service lifespan for the associated product. A service part is commonly referred as a Last Time Buy part when several years have passed after the end of mass production of the associated product and there is no longer any significant demand for the associated product or its parts. The trigger to start treating a service part as a Last Time Buy part is typically an announcement from the part manufacturer requesting purchasers to initiate final purchases of the service part, as the manufacturer will soon cease providing the service part for purchase.

Forecasting Last Time Buy quantities for service parts is an important issue for industries such as those mentioned above. For example, adequately forecasting Last Time Buy quantities for service parts may significantly reduce inventory costs, improve planning, and increase profitability. However, forecasting Last Time Buy quantities for service parts is a challenging task. Unfortunately, there has been little success developing suitable approaches for estimating future demand for Last Time Buy service parts. For example, one previous approach uses a moving average of order histories to detect a trend (e.g., up, flat, or down) and then uses a different technique to estimate future demand depending on the nature of the trend (e.g., an exponential technique for an up or flat trend or a "stair" technique for a down trend). Problems associated with this and other previous approaches make such approaches inadequate for many needs.

SUMMARY OF THE INVENTION

According to the present invention, disadvantages and problems associated with previous techniques for forecasting Last Time Buy quantities for service parts may be reduced or eliminated.

In one embodiment of the present invention, a method for forecasting a Last Time Buy quantity for a service part using a low-pass filter approach is provided. The method includes accessing input data including: (1) a service lifespan beginning at the end of mass production of a product associated with the service part; (2) data reflecting past accumulated production of the associated product for at least a first period beginning at the end of mass production of the associated product; and (3) an order data series reflecting past quantities of the service part ordered in each of a succession of periods beginning with a second period that immediately follows the first period and ending with a current period. A low-pass filter is applied to at least a portion of the order data series to extract low frequency components representing a smoothed order data series. A local maximum is sought within the smoothed order data series subject to predetermined conditions. If a local maximum is found within the smoothed order data series, exponential forecasting is performed according to the smoothed order data series to generate an estimated Last Time Buy quantity for the service part over all remaining periods of the service lifespan following the current period. The estimated Last Time Buy quantity for the service part is made available for use in connection with one or more business analyses.

Particular embodiments of the present invention may provide one or more technical advantages. Certain embodiments may provide an approach for forecasting Last Time Buy quantities of service parts that is more accurate and therefore reduces inventory costs, improves planning, and increases profitability relative to previous approaches. The lack of appropriate approaches to estimate future demand for Last Time Buy service parts has been a bottleneck to effective service part management. Certain embodiments of the present invention may alleviate this bottleneck to allow businesses to better plan and more effectively manage their service parts operations. Certain embodiments may provide a useful forecasting tool that can be applied to service parts for products in a variety of industries, such as for example automotive, high tech, electronics, appliances, and the like. In addition, the forecasted Last Time Buy quantities may be used as input to other planning processes or for any other business analysis purposes.

Certain embodiments provide a low-pass filter approach used to extract a low frequency trend component from historical order data for a service part. Extracting a low frequency component using a conventional moving average approach primarily depends on two dimensions: (1) the number of time lags and/or leads; (2) the weights associated with the lags and/or leads. There are two major shortcomings of using a moving approach in forecasting Last Time Buy quantities: (1) the length of the lag and/or lead reduces the number of estimated trends, which is critical in many Last Time Buy forecasting scenarios because of lack of data points; (2) the complexity of the space spanned by these two dimensions discourages searching for better estimated trends. In contrast to a conventional moving average approach, certain embodiments of the present invention extract a low frequency component from historical order data for a service part, where the "bandwidth" of the low frequency component to be kept relies on only one parameter.

Certain embodiments of the present invention may provide all, some, or none of these technical advantages. Certain embodiments may provide one or more other technical advantages, one or more of which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 1 illustrates an example computer-based system for forecasting a Last Time Buy quantity for a service part using a low-pass filter approach; and FIG. 2 illustrates an example computer-based process for forecasting a Last Time Buy quantity for a service part using a low-pass filter approach.

DESCRIPTION OF EXAMPLE EMBODIMENTS

FIG. 1 illustrates an example computer-based system 10 for forecasting a Last Time Buy (LTB) quantity for a service part using a low-pass filter approach. The present invention contemplates system 10 forecasting LTB quantities for any suitable service parts for any suitable products in any suitable industries. The present invention may be applied to any suitable business analyses that depends on forecasted LTB quantities as input. Such analyses may include, for example only and without limitation, service part risk management analysis (if production cost and legal penalty are low, then under-production may be a good business strategy, and vice versa) and inventory control analysis.

In one embodiment, system 10 includes client 12, server 14, and database 16. Client 12 may include one or more processes for providing input data, performing business analyses, or other suitable tasks. Although these processes may be separate processes running on a dedicated client processor, the present invention contemplates these processes being integrated, in whole or in part, and running on one or more processors within the same or different computer systems. Similarly, server 14 may include one or more processes to receive input data from client 12, to manipulate the input data and other suitable data according to the present invention, and to interact with database 16 as appropriate to provide output data to client 12. Although these processes may be separate processes running on a dedicated server processor, the present invention contemplates these processes being integrated, in whole or in part, and running on one or more processors in the same or different computer systems. Client 12 and server 14 may be fully autonomous or may operate at least in part subject to input from users of system 10.

Database 16 provides persistent data storage for system 10 and may store any data suitable to support the operation of system 10 in forecasting LTB quantities for service parts according to the present invention. While the term "database" is used, a memory or another suitable data storage arrangement may be used without departing from the intended scope of the present invention, and use of the term "database" is meant to encompass all suitable arrangements.

In one embodiment, database 16 is populated with data received from one or more data sources internal, external, or both internal and external to the enterprise or facility associated with the system 10.

For example and not by way of limitation, input data received from client 12 or otherwise and stored in database 16 for use in forecasting an LTB quantity for a service part may include:

(1) a data series $\{Q_0, Q_1, \ldots Q_c\}$ reflecting historical accumulated production of the associated product for each of a succession of periods starting at the end of mass production of the associated product ($Q_0$) and ending at a current period ($Q_c$);

(2) a data series $\{O_1, O_2, \ldots O_c\}$ reflecting historical quantities of the service part ordered in each of a succession of periods starting at the first period after the end of mass production of the associated product ($O_1$) and ending at the current period ($O_c$);

(3) a data series $\{D_1, D_2, \ldots D_c\}$ reflecting historical demand rates for the service part for each of the succession of periods starting at the first period after the end of mass production of the associated product ($D_1$) and ending at the current period ($D_c$), where the demand rate for a period t is defined as $D_t = O_t/Q_0$;

(4) a service lifespan SL of the associated product following the end of mass production of the associated product, measured in years or otherwise and determined according to law, regulations, business goals, or other guidelines; and (5) a number $N_0$ of remaining periods in the service lifespan of the associated product.

Periods may be months, quarters, years, or any other suitable periods. In a particular embodiment, minimum data requirements for forecasting an LTB quantity for a service part include the data point $Q_0$, the data series $\{O_1, O_2, \ldots O_c\}$, and the service lifespan SL. In this embodiment, if these minimum data requirements are not met, then forecasting of the LTB quantity may not proceed. However, the present invention contemplates other embodiments with different data requirements.

Output data generated according to the present invention, whether for storage in database 16, communication to client 12, or otherwise, includes:

(1) a data series $\{\hat{O}_{c+1}, \hat{O}_{c+2}, \ldots \hat{O}_N\}$ reflecting estimated future quantities of the service part ordered in each of a succession of remaining periods in the service lifespan, starting at the first period after the current period ($\hat{O}_{c+1}$) and ending at the last period of the service lifespan ($\hat{O}_N$); and (2) an LTB quantity for the service part reflecting the total estimated future quantity of the service part ordered over all remaining periods in the service lifespan, starting at the first period after the current period and ending at the last period of the service lifespan.

As described briefly above, client 12, server 14, and database 16 may each operate on one or more computer systems. Each such computer system may include one or more input devices to receive, and output devices to communicate, information associated with the operation of system 10. Each such computer system may include fixed or removable storage media, such as a magnetic hard disk, CD-ROM, or other storage media. Each such computer system may include one or more processors and associated memory to execute instructions and manipulate information according to the operation of system 10. Where multiple computer systems support client 12, server 14, and database 16, these computer systems may share one or more resources as appropriate. Use of the term "computer system" herein is meant to encompass any suitable computing device, according to the particular implementation. Client 12, server 14, and database 16 are coupled to each other using links 18, which may each include one or more computer buses, local area networks (LANs), metropolitan area networks (MANs), wide area networks (WANs), portions of the Internet, or any other wireline, optical, wireless, or other links suitable to support communications between client 12, server 14, and database 16 during the operation of system 10.

FIG. 2 illustrates an example method for forecasting an LTB quantity of a service part. The following notation and definitions may be useful in understanding the present invention and the example process described below:

t Particular period being analyzed
t=1 First period of service lifespan (first period after end of mass production)
t=0 Period starting at end of mass production (one period before first period of service lifespan)
t=c Current period
t=c+1 First period of LTB
N End of service lifespan (last period of LTB)
$N_0$ Number of remaining periods in service lifespan
$Q_t$ Quantity of accumulated production of associated product at period t
(t=0, 1, ... c)
$O_t$ Quantity of service part ordered in period t
(t=1, 2, ... c)
$D_t$ Demand rate $$D_t = \frac{O_t}{Q_0}$$

$\tilde{O}_t$ Smoothed quantity of service part ordered in period t
(t=c+1, c+2, ... N)
$\hat{O}_t$ Estimated future quantity of service part ordered in period t
(t=c+1, c+2, ... N)

The process begins at step 100, where server 14 accesses suitable input data from client 12, from database 16, or otherwise. In one embodiment for example, as described above, input data may include:

(1) a data series $\{Q_0, Q_1, \ldots Q_c\}$ reflecting historical accumulated production of the associated product for each of a succession of periods starting at the end of mass production of the associated product ($Q_0$) and ending at a current period ($Q_c$);

(2) a data series $\{O_1, O_2, \ldots O_c\}$ reflecting historical quantities of the service part ordered in each of a succession of periods starting at the first period after the end of mass production of the associated product ($O_1$) and ending at the current period ($O_c$);

(3) a data series $\{D_1, D_2, \ldots D_c\}$ reflecting historical demand rates for the service part for each of the succession of periods starting at the first period after the end of mass production of the associated product ($D_1$) and ending at the current period ($D_c$), where the demand rate for a period t is defined as $D_t=O_t/Q_0$;

(4) a service lifespan SL of the associated product following the end of mass production of the associated product, measured in years or otherwise and determined according to law, regulations, business goals, or other guidelines; and (5) a number $N_0$ of remaining periods in the service lifespan of the associated product.

Periods may be months, quarters, years, or any other suitable periods. In a particular embodiment, minimum data requirements for forecasting an LTB quantity for a service part include the data point $Q_0$, the data series $\{O_1, O_2, \ldots O_c\}$, and the service lifespan SL. In this embodiment, if these minimum data requirements are not met, then forecasting of the LTB quantity may not proceed. However, the present invention contemplates other embodiments with different data requirements.

At step 102, server 14 initializes one or more parameters used in forecasting an LTB quantity for the service part. In one particular embodiment, these parameters include the following and are initialized to the following values, although the present invention contemplates any suitable parameters being initialized to any appropriate values:

$\Gamma_0=0.01$, where $\Gamma_0$ is a share parameter representing a lower bound of market demand share for the LTB period;

$\lambda=100$, where $\lambda$ is a smoothing parameter used in applying a low-pass filter to the data series $\{O_1, O_2, \ldots O_c\}$, as described more fully below;

$\theta=0.5$, where $\theta$ is a division parameter representing a split of the LTB period;

$\eta=0.825$, where $\eta$ is a first decelerating parameter representing a declining rate of service part demand; and $\mu=0.5$, where $\mu$ is a second decelerating parameter representing a declining rate of service part demand.

At step 104, server 14 checks data availability to ensure that the accessed input data meets any applicable minimum data requirements. As an example, as described above, in one embodiment minimum data requirements include the data point $Q_0$, the data series $\{O_1, O_2, \ldots O_c\}$, and the service lifespan SL. If one or more minimum data requirements are not met at step 106, then in one embodiment forecasting of an LTB quantity for the service part cannot proceed and the method ends. If all the minimum data requirements are met at step 106, and if the number $N_0$ of remaining periods in the service lifespan is not available at step 108, then server 14 calculates $N_0$ at step 110. In one embodiment, for a service lifespan in years and periods of a month, $N_0$ is calculated as SL*12. In the alternative, if $N_0$ is available at step 108, then server 14 sets $N=N_0$ at step 112.

At step 114, server 14 may delete all leading zeros, if any exist, from the data series $\{O_1, O_2, \ldots O_c\}$ (referred to hereafter for convenience as the "order data series") to yield a resulting order data series $\{O_i, O_{i+1}, \ldots O_c\}$. At step 116, server 14 applies a low-pass filter to the resulting order data series $\{O_i, O_{i+1}, \ldots O_c\}$ to yield a smoothed order data series $\{\tilde{O}_i, \tilde{O}_{i+1}, \ldots \tilde{O}_c\}$ according to the value of the parameter $\lambda$. In one particular embodiment, as described above, $\lambda=100$, although $\lambda$ may have any suitable value according to particular needs. In general, the present invention applies a low-pass filter to the resulting order data series $\{O_i, O_{i+1}, \ldots O_c\}$ to extract lower frequency components which represent the smoothed order data series $\{\tilde{O}_i, \tilde{O}_{i+1}, \ldots \tilde{O}_c\}$.

In one embodiment, the low-pass filter may be obtained as the solution to the following minimization problem:

$$\underset{\{s_t\}_{t=0}^{T+1}}{\text{Min}} \sum_{t=1}^{T} \{[(y_t - s_t)^2 + \lambda[(s_{t+1} - s_t) - (s_t - s_{t-1})]^2\} \quad (1)$$

where $y_t$ is an observed time series (usually non-stationary), $s_t$ is a lower frequency component, and $\lambda$ is a smoothing parameter with range $[0, +\infty)$.

The closed form solution of problem (1) can be expressed as:

$$LF = (\lambda \cdot P + U)^{-1} \quad (2)$$

where U is an identity matrix of dimension n (the number of observed data points in the time series) and P is a Toeplitz matrix. To more fully understand the use of low-pass filtering in this context, consider the limiting version of the first order closed form solution to problem (1):

$$LF=[1+\lambda(1-B)^2(1-B^{-1})^2]^{-1} \quad (3)$$

where B is backward operator.

The Fourier transform of this filter has a particularly simple form:

$$LF(\omega) = \frac{1}{1+4\lambda[1-\cos(\omega)]^2}. \quad (4)$$

Thus, the filter assigns a weight of approximately one at frequencies close to zero (since $\cos(0)=1$) and assigns a weight of approximately zero at higher frequencies (since $\cos(\pi)=-1$ implies that $LF(\pi)=1/(1+16\lambda)$, which is approximately zero for a large value of $\lambda$).

The bandwidth of this filter, and therefore its ability to filter out the higher frequency components, depends only on the predetermined value of the smoothing parameter, $\lambda$. Larger values of $\lambda$ penalize changes in the low-pass component and result in a smoother low-pass component. Reliance on a single parameter, $\lambda$, as opposed to a very large number of time and/or weight parameters as in previous techniques, may significantly reduce the complexity of the problem space. This may provide an important technical advantage over previous techniques.

At step 118, server 14 attempt to find a local maximum in the smoothed order data series $\{\tilde{O}_i, \tilde{O}_{i+1}, \ldots \tilde{O}_c\}$. Although the present invention contemplates finding a local maximum in any manner, in a particular embodiment server 14 attempts to find a special local maximum, LM(s) such that:

(1) LM(u) are local maxima of $\{\tilde{O}_i, \tilde{O}_{i+1}, \ldots \tilde{O}_c\}$ where $u \in \{i, \ldots c-1\}$ (2) $LM(u) > \tilde{O}_c$ (3) $c-s = \min\{c-u | \forall u\}$ (where s is a particular u, if multiple exist, closest to c; and (4) $c-s > 3$ Condition (3) is used to select the local maximum revealing the most recent trending. Condition (4) is used to ensure that a sufficient number of observations are used in estimating the exponential trend curve. If conditions (1) through (4) are all satisfied, then LM(s) is the unique local maximum with shortest distance c-s (not including any $c-s \leq 3$).

In one embodiment, if LM(s) is found at step 120, then server 14 performs exponential forecasting at step 122 to generate an estimated LTB quantity for the service part. In general, if the smoothed order series shows a clear downward trend pattern, then an exponential curve may be fitted for the smoothed order data series and, based on the fitted curve, an estimated LTB quantity may be extrapolated. In a particular embodiment, exponential forecasting involves the following procedures:

(1) Specify dependent and independent variables:
 Dependent variable: $\{lg(\tilde{O}_t)\}_{t=s,\ldots c}$
 Independent variable: $\{t\}_{t=s,\ldots,c}$ (2) Perform a linear regression algorithm to yield regression coefficients
 (constant and slope)

(3) Calculate $\hat{O}_t = \exp(\text{cons tan t})*\exp(\text{slope}*t)$
 (t=c+1, c+2, ... SL*12, for SL in years and for monthly periods)

(4)

$$\text{Calculate } LTB = \sum_{c+1}^{SL*12} \hat{O}_t$$

In one embodiment, if the sought after local maximum LM(s) is not found at step 120, then server 14 may perform one of an "uptrend/N" algorithm (step 128), an "uptrend/A" algorithm (step 130), or a discriminant analysis (step 132) to generate an estimated LTB quantity for the service part. These alternatives are described more fully below.

An "early LTB" scenario may exist in which the observed demand history and thus the numbers of data points in the order data series, resulting order data series, and smoothed order data series are relatively small. As a particular example, an early LTB scenario may be defined as $c \leq SL*12*0.5$ (meaning in this example that the current period lies in the first half of the service lifespan). However, the present invention contemplates defining an early LTB scenario in any manner according to particular needs.

For example, assume service part ABC began its service period in October 2001 and the length of the service period is eight years (ninety-six months). Also assume there are seven monthly demand observations available. It would likely be dangerous to forecast the total LTB quantity for the remaining eighty-nine months based only on the information provided in these seven demand observations. More technically speaking, univariate time series approaches are likely not appropriate for this situation. Instead, an approach relying on "cross-sectional" information for other relevant service parts may be provided according to the present invention. Although in this example there is insufficient information for service part ABC, if information is available for one or more other relevant service parts a reasonable forecast may be generated for service part ABC. For example, assume that demand observations are available for the entire ninety-six month service lifespan for twenty other relevant service parts and that one of these twenty other relevant service parts is sufficiently similar to service part ABC in the sense that their demand patterns are sufficiently similar. In this case, it may be adequate to use demand rates for that similar service part, over the entire ninety-six month service lifespan, as the instrumental demand rates for part ABC, then forecast an LTB quantity for service part ABC based on those demand rates. In one embodiment, as described below (step 132), the present invention uses a discriminant approach to identify a suitably similar service part. "Profiling data" that represents order data series for one or more potentially similar service parts may be obtained, for example, from customers and may vary from customer to customer for the same potentially similar service part.

If an early LTB scenario does not exist at step 124, and $$\Gamma = \sum_{t=1}^{SL*12*0.5} D_t - \sum_{SL*12*0.5+1}^{c} D_t \geq \Gamma_0$$

at step 126, then server 14 may perform the uptrend/N algorithm at step 128. In general, the uptrend/N algorithm is used for cases in which the smoothed order data series reveals a clear upward trend up to period c. With the assumption that the revealed upward trend will eventually fade out during the remaining service lifespan, a "dominance of substitution" assumption will apply. Dominance of substitution can be briefly be explained as follows. Demand for a service part can be primarily decomposed into two components: (1) positive demand triggered by the failure of parts, which should increase over time since the failure rate should increase over the service lifespan; and (2) negative demand resulting from product substitution (for example, a new product with improved technology being substituted for an older part). It is generally understood that substitution effects dominate failure rate effects over the full service lifespan. More quantitatively, the summation of demand rates over the first half of the service lifespan is generally greater than over the second half of the service lifespan. In one embodiment, under the dominance of substitution assumption and given $\Gamma_0$, the estimated LTB quantity is the upper bound demand quantity. In a particular embodiment, the uptrend/N algorithm involves the following procedures:

(1) Solve the non-linear equation $$e^{-\beta} - e^{-\beta n} - \frac{\Gamma}{\alpha}\beta = 0,$$

where $\alpha = D_c$ and $n = N - c$ (to disaggregate the total estimated LTB quantity)

(2) Calculate the estimated order quantity $$\hat{O}_{c+i} = (\alpha e^{-\beta i}) * Q_c, i = 1, 2, \ldots n$$

(3)

$$\text{Calculate } LTB = \sum_{i=c+1}^{N} \hat{O}_i.$$

The approach incorporated in the uptrend/N algorithm can be considered to materialize conventional business wisdom into the LTB forecasting process. In practice, forecasters often struggled with the seeming inconsistency of a revealed upward trend with a likely downward tendency of demand for service parts.

In the alternative, if an early LTB scenario does not exist at step 124, and parameter $\Gamma < \Gamma_0$ at step 126, then server 14 may perform the uptrend/A algorithm at step 130. In general, like the uptrend/N algorithm, the uptrend/A algorithm is used for cases in which the smoothed order data series reveals a clear upward trend up to period c. However, in contrast to the uptrend/N algorithm, with the assumption that the upward trend will eventually fade out during the remaining service lifespan, the dominance of substitution assumption will not apply. Since substitution effects are not dominant, these cases can be considered abnormal. The uptrend/A algorithm involves application of a stair technique, generally involving calculating estimated demand for each period in the first half of the service lifespan, calculating estimated demand for each period in the second half of the service lifespan, and summing the estimated demands for the first and second halves of the service lifespan to generate an estimated LTB quantity for the service part. In a particular embodiment, the uptrend/A algorithm involves the following procedures:

(1) Calculate the estimated order quantity $$\hat{O}_t = \tilde{O}_c^* \eta, \forall t = c+1, \ldots, c+\theta^*(N-c)$$

$$\hat{O}_t = \tilde{O}_c^* \mu, \forall t = c+\theta^*(N-c)+1, \ldots N$$

(2) Calculate $LTB = \sum_{i=c+1}^{N} \hat{O}_i = \tilde{O}_c^* \eta^* \theta(N-c) + \tilde{O}_c^* \mu(1-\theta)^*(N-c)$ If an early LTB scenario does exist at step 124, then server 14 may perform a discriminant analysis at step 132. As described above, an early LTB scenario is a case in which insufficient data exists for adequate time series forecasting. Instead, cross-sectional data for one or more similar service parts is used. In a particular embodiment, discriminant analysis involves the following procedures:

(1) Calculate the demand rate $$D_t = \frac{O_t}{Q_0}, t = 1, 2, \ldots c, \text{ or}$$

$$D_t = \frac{O_t}{Q_t}, \text{ if } Q_t \text{ is available}$$

$$d_i = \frac{1}{c}\sum_{i=1}^{c} |D_t - (SL)D_t(i)| \ i = 1, \ldots, k.$$

$$d_m = \text{Min}\{d_i\}_{i=1,\ldots,k}$$

Note that (SL)D(i) represents a string of characters. For example, if SL=6Y, i=2, then (SL)D(i) is 6YD2. This character string implies that this is the second demand profiling data in the category with SL equal to six years. Consequently, $(6YD2)_t$ stands for the demand rate at period t.

(2) Denote $D_t = [(SL)D(m)]_t$, where m is determined by $d_m$.

(3) Calculate the estimated order quantity $$\hat{O}_t = D_t * Q_0, t = 1, 2, \ldots N$$

(4)

$$\text{Calculate } LTB = \sum_{i=c+1}^{N} \hat{O}_i$$

After generating an estimated LTB quantity for the service part at step 122, 128, 130, or 132, server 14 may make the estimated LTB quantity value available for use in one or more business analyses at step 134, and the process ends. For example, server 14 may store the estimated LTB quantity value in database 16 or in another suitable storage location associated with server 14, may communicate the estimated LTB quantity value to one or more other components, or may otherwise make the estimated LTB quantity value available.

Although the present invention has been described with several embodiments, a plurality of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for forecasting a Last Time Buy quantity for a service part using a low-pass filter approach, comprising:
   accessing input data comprising:
   a service lifespan beginning at the end of mass production of a product associated with the service part;

data reflecting past accumulated production of the associated product for at least a first period beginning at the end of mass production of the associated product; and an order data series reflecting past quantities of the service part ordered in each of a succession of periods beginning with a second period that immediately follows the first period and ending with a current period;

applying a low-pass filter to at least a portion of the order data series to extract low frequency components representing a smoothed order data series;

performing exponential forecasting according to the smoothed order data series for a local maximum in the smoothed order data series;

generating an estimated Last Time Buy quantity for the service part over all remaining periods of the service lifespan following the current period, wherein the Last Time Buy quantity is calculated using the following equation:

$$\text{Last Time Buy} = \sum_{i=c+1}^{N} \hat{O}_i = \tilde{O}_c^* \eta^* \theta (N-c) + \tilde{O}_c^* \mu (1-\theta)^* (N-c);$$

wherein $\hat{O}_i$ is defined as a forecasted smoothed order data series, wherein $\tilde{O}_c$ is defined as a smoothed order data series, $\theta$ is defined as a fixed constant value representing a division of the Last Time Buy period, N is the total number of periods in the service lifespan, c is defined as the current period, $\eta$ is defined as the total number of periods in the service lifespan minus the current period, and $\mu$ is defined as a fixed constant value that represents a declining rate of service part demand; and making the estimated Last Time Buy quantity for the service part available for use in connection with one or more business analyses.

2. The method of claim 1, wherein the data reflecting past accumulated production of the associated product comprises such data for each of a succession of periods beginning with the first period and ending with the current period.

3. The method of claim 1, wherein the input data further comprises a data series reflecting past demand rates for the service part for each of the succession of periods beginning with the first period and ending with the current period, the demand rate for a period being the past quantity of the service part ordered in the period divided by the past accumulated production of the associated product for the first period.

4. The method of claim 1, wherein the input data further comprises a number of remaining periods in the service lifespan.

5. The method of claim 1, wherein the low-pass filter operates according to a smoothing parameter having a predetermined value that is independent of periods associated with the input data.

6. The method of claim 1, further comprising deleting all leading zeros, if any, from the order data series prior to application of the low-pass filter.

7. The method of claim 1, wherein the local maximum is selected to reveal recent trending in the smoothed order data series and is more than three periods prior to the current period to ensure that sufficient data exists for the exponential forecasting.

8. The method of claim 1, wherein exponential forecasting comprises:

generating an exponential trend curve reflecting estimated future demand for the service part in each remaining period of the service lifespan; and summing the estimated future demand for the service part over all remaining periods of the service lifespan to generate the estimated Last Time Buy quantity for the service part.

9. The method of claim 1, wherein the smoothed order data series reveals an upward trend from the first period to the current period, the smoothed order data series contains data for a sufficient number of periods, and a value of a first parameter is not less than a predetermined threshold for the share parameter, the method further comprises:

solving a non-linear equation to disaggregate the estimated LTB quantity;

generating an estimated future order quantity for the service part in each of a succession of periods beginning with a first remaining period and ending with a last period of the service lifespan; and summing the estimated future order quantities over all remaining periods to generate the estimated LTB quantity.

10. The method of claim 9, wherein the smoothed order data series contains data for a sufficient number of periods if the current period is in the second half of the service lifespan.

11. The method of claim 9, wherein according to the value of the first parameter, the upward trend will fade out over remaining periods of the service lifespan and that part substitution effects on future demand for the service part will dominate part failure rate effects on future demand for the service part over the remaining periods of the service lifespan.

12. The method of claim 1, wherein the smoothed order data series reveals an upward trend from the first period to the current period and the smoothed order data series contains data for a sufficient number of periods, the method further comprises:

calculating estimated demand for each period within the first half of the service lifespan;

calculating estimated demand for each period within the second half of the service lifespan; and summing the estimated demand for the first half of the service lifespan and the estimated demand for the second half of the service lifespan to generate an estimated Last Time Buy quantity for the service part.

13. The method of claim 12, wherein according to the value of the first parameter it is assumed that the upward trend will fade out over remaining periods of the service lifespan and that part substitution effects on future demand for the service part will not dominate part failure rate effects on future demand for the service part over the remaining periods of the service lifespan.

14. The method of claim 1, wherein the smoothed order data series does not contain data for a sufficient number of periods, the method further comprises:

performing a discriminant analysis to identify another service part having a demand pattern similar to that of the service part; and using, in place of the order data series for the service part, a data series reflecting past demand rates for the other service part for each of the succession of periods beginning with the first period and ending with the current period, the demand rate for a period being the past quantity of the other service part ordered in the period divided by the past accumulated production of a product associated with the other service part for the first period.

15. The method of claim 14, wherein the smoothed order data series contains data for a sufficient number of periods if the current period is in the second half of the service lifespan.

16. The method of claim 1, wherein a business analysis comprises one of service part risk management analysis and inventory control analysis.

17. A system for forecasting a Last Time Buy quantity for a service part using a low-pass filter approach, comprising:
a database operable to store input data comprising:
a service lifespan beginning at the end of mass production of a product associated with the service part;
data reflecting past accumulated production of the associated product for at least a first period beginning at the end of mass production of the associated product; and
an order data series reflecting past quantities of the service part ordered in each of a succession of periods beginning with a second period that immediately follows the first period and ending with a current period;
one or more processors collectively operable to:
access the input data;
apply a low-pass filter to at least a portion of the order data series to extract low frequency components representing a smoothed order data series;
perform exponential forecasting according to the smoothed order data series for a local maximum in the smoothed order data series;
generate an estimated Last Time Buy quantity for the service part over all remaining periods of the service lifespan following the current period, wherein the Last Time Buy quantity is calculated using the following equation:

$$\text{Last Time Buy} = \sum_{i=c+1}^{N} \hat{O}_i = \tilde{O}_c^* \eta^* \theta(N-c) + \tilde{O}_c^* \mu(1-\theta)^*(N-c);$$

wherein $\hat{O}_i$ is defined as a forecasted smoothed order data series, wherein $\tilde{O}_c$ is defined as a smoothed order data series, $\theta$ is defined as a fixed constant value representing a division of the Last Time Buy period, N is the total number of periods in the service lifespan, c is defined as the current period, $\eta$ is defined as the total number of periods in the service lifespan minus the current period, and $\mu$ is defined as a fixed constant value that represents a declining rate of service part demand; and
make the estimated Last Time Buy quantity for the service part available for use in connection with one or more business analyses.

18. Software for forecasting a Last Time Buy quantity for a service part using a low-pass filter approach, the software being embodied in computer-readable media and when executed operable to:
access input data comprising:
a service lifespan beginning at the end of mass production of a product associated with the service part;
data reflecting past accumulated production of the associated product for at least a first period beginning at the end of mass production of the associated product; and
an order data series reflecting past quantities of the service part ordered in each of a succession of periods beginning with a second period that immediately follows the first period and ending with a current period;
apply a low-pass filter to at least a portion of the order data series to extract low frequency components representing a smoothed order data series;
perform exponential forecasting according to the smoothed order data series for a local maximum in the smoothed order data series;
generate an estimated Last Time Buy quantity for the service part over all remaining periods of the service lifespan following the current period, wherein the Last Time Buy quantity is calculated using the following equation:

$$\text{Last Time Buy} = \sum_{i=c+1}^{N} \hat{O}_i = \tilde{O}_c^* \eta^* \theta(N-c) + \tilde{O}_c^* \mu(1-\theta)^*(N-c);$$

wherein $\hat{O}_i$ is defined as a forecasted smoothed order data series, wherein $\tilde{O}_c$ is defined as a smoothed order data series, $\theta$ is defined as a fixed constant value representing a division of the Last Time Buy period, N is the total number of periods in the service lifespan, c is defined as the current period, $\eta$ is defined as the total number of periods in the service lifespan minus the current period, and $\mu$ is defined as a fixed constant value that represents a declining rate of service part demand; and
make the estimated Last Time Buy quantity for the service part available for use in connection with one or more business analyses.

19. The software of claim 18, wherein the data reflecting past accumulated production of the associated product comprises such data for each of a succession of periods beginning with the first period and ending with the current period.

20. The software of claim 18, wherein the input data further comprises a data series reflecting past demand rates for the service part for each of the succession of periods beginning with the first period and ending with the current period, the demand rate for a period being the past quantity of the service part ordered in the period divided by the past accumulated production of the associated product for the first period.

21. The software of claim 18, wherein the input data further comprises a number of remaining periods in the service lifespan.

22. The software of claim 18, wherein the low-pass filter operates according to a smoothing parameter having a predetermined value that is independent of periods associated with the input data.

23. The software of claim 18, further operable to delete all leading zeros, if any, from the order data series prior to application of the low-pass filter.

24. The software of claim 18, wherein the local maximum is selected to reveal recent trending in the smoothed order data series and is more than three periods prior to the current period to ensure that sufficient data exists for the exponential forecasting.

25. The software of claim 18, wherein exponential forecasting comprises:
  generating an exponential trend curve reflecting estimated future demand for the service part in each remaining period of the service lifespan; and
  summing the estimated future demand for the service part over all remaining periods of the service lifespan to generate the estimated Last Time Buy quantity for the service part.

26. The software of claim 18, wherein the smoothed order data series reveals an upward trend from the first period to the current period, the smoothed order data series contains data for a sufficient number of periods, and a value of a first parameter is not less than a predetermined threshold for the share parameter, the software is further operable to:
  solve a non-linear equation to disaggregate the estimated LTB quantity;
  generate an estimated future order quantity for the service part in each of a succession of periods beginning with a first remaining period and ending with a last period of the service lifespan; and
  sum the estimated future order quantities over all remaining periods to generate the estimated LTB quantity.

27. The software of claim 26, wherein the smoothed order data series contains data for a sufficient number of periods if the current period is in the second half of the service lifespan.

28. The software of claim 26, wherein according to the value of the first parameter, the upward trend will fade out over remaining periods of the service lifespan and that part substitution effects on future demand for the service part will dominate part failure rate effects on future demand for the service part over the remaining periods of the service lifespan.

29. The software of claim 18, wherein if a local maximum is not found, if the smoothed order data series reveals an upward trend from the first period to the current period and if the smoothed order data series contains data for a sufficient number of periods, then the software is further operable to:
  calculate estimated demand for each period within the first half of the service lifespan;
  calculate estimated demand for each period within the second half of the service lifespan; and
  sum the estimated demand for the first half of the service lifespan and the estimated demand for the second half of the service lifespan to generate an estimated Last Time Buy quantity for the service part.

30. The software of claim 29, wherein according to the value of the first parameter it is assumed that the upward trend will fade out over remaining periods of the service lifespan and that part substitution effects on future demand for the service part will not dominate part failure rate effects on future demand for the service part over the remaining periods of the service lifespan.

31. The software of claim 18, wherein the smoothed order data series does not contain data for a sufficient number of periods, the software is further operable to:
  perform a discriminant analysis to identify another service part having a demand pattern similar to that of the service part; and
  use, in place of the order data series for the service part, a data series reflecting past demand rates for the other service part for each of the succession of periods beginning with the first period and ending with the current period, the demand rate for a period being the past quantity of the other service part ordered in the period divided by the past accumulated production of a product associated with the other service part for the first period.

32. The software of claim 31, wherein the smoothed order data series contains data for a sufficient number of periods if the current period is in the second half of the service lifespan.

33. The software of claim 18, wherein a business analysis comprises one of service part risk management analysis and inventory control analysis.

* * * * *